No. 712,175. Patented Oct. 28, 1902.
F. BERLIN.
SEED PLANTER.
(Application filed July 12, 1901.)
(No Model.) 3 Sheets—Sheet 2.

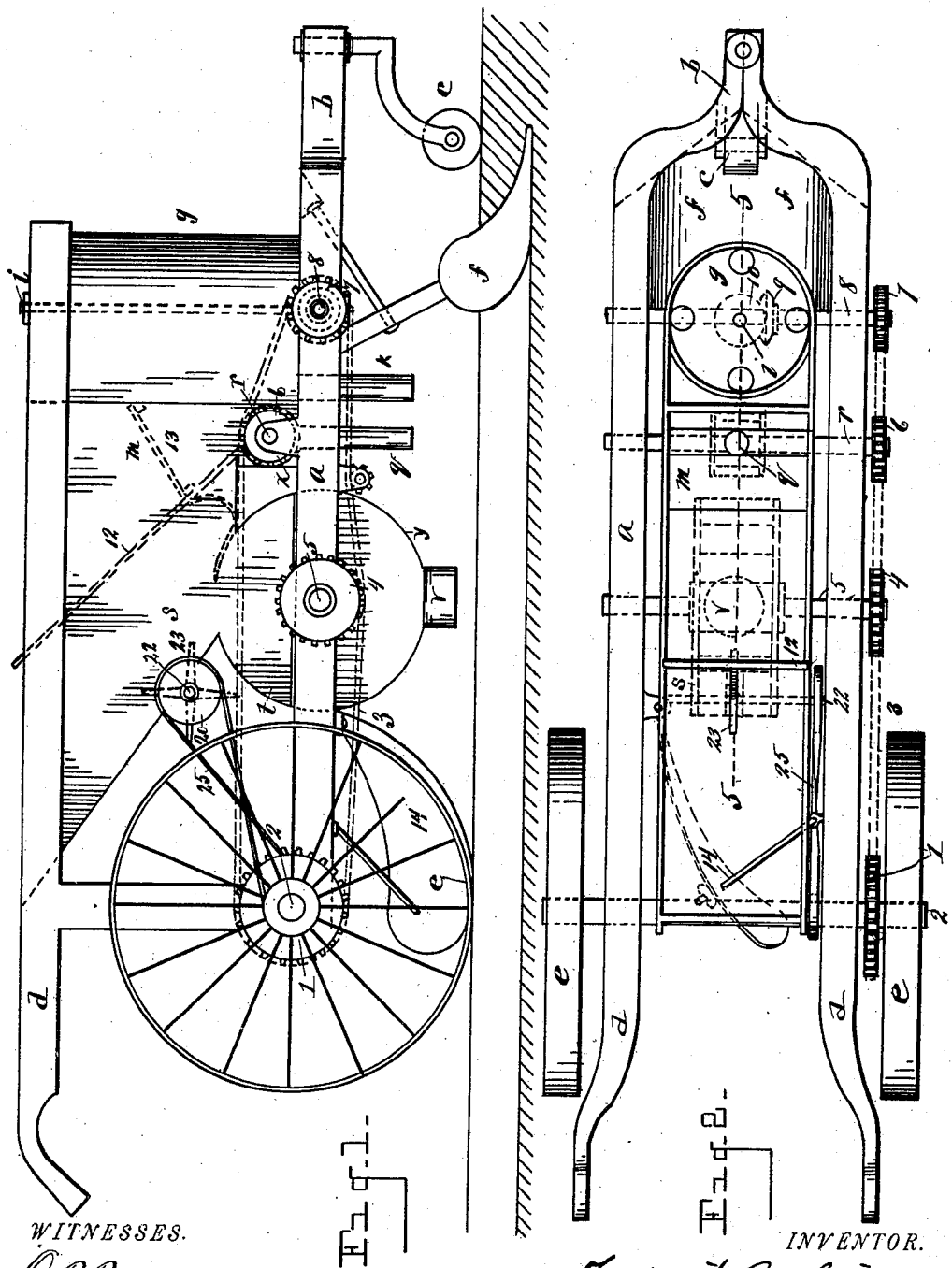

WITNESSES. INVENTOR.
Frederik Berlin
By Murrell S. Wright
his Attorney

No. 712,175. Patented Oct. 28, 1902.
F. BERLIN.
SEED PLANTER.
(Application filed July 12, 1901.)

(No Model.) 3 Sheets—Sheet 3.

WITNESSES.
J. M. Poland.
M. C. Stowell

INVENTOR.
Frederick Berlin
By Newell S. Wright.
His Attorney

UNITED STATES PATENT OFFICE.

FREDERICK BERLIN, OF DETROIT, MICHIGAN.

SEED-PLANTER.

SPECIFICATION forming part of Letters Patent No. 712,175, dated October 28, 1902.

Application filed July 12, 1901. Serial No. 67,981. (No model.)

*To all whom it may concern:*

Be it known that I, FREDERICK BERLIN, a citizen of the United States, residing at Detroit, county of Wayne, State of Michigan, have invented a certain new and useful Improvement in Seed-Planters; and I declare the following to be a full, clear, and exact description of the invention, such as will enable others skilled in the art to which it appertains to make and use the same, reference being had to the accompanying drawings, which form a part of this specification.

My invention has for its object an improved seed-planter of novel and superior construction and utility; and it consists of the construction, combination, and arrangement of devices hereinafter described and claimed, and illustrated in the accompanying drawings, in which—

Figures 3, 4:
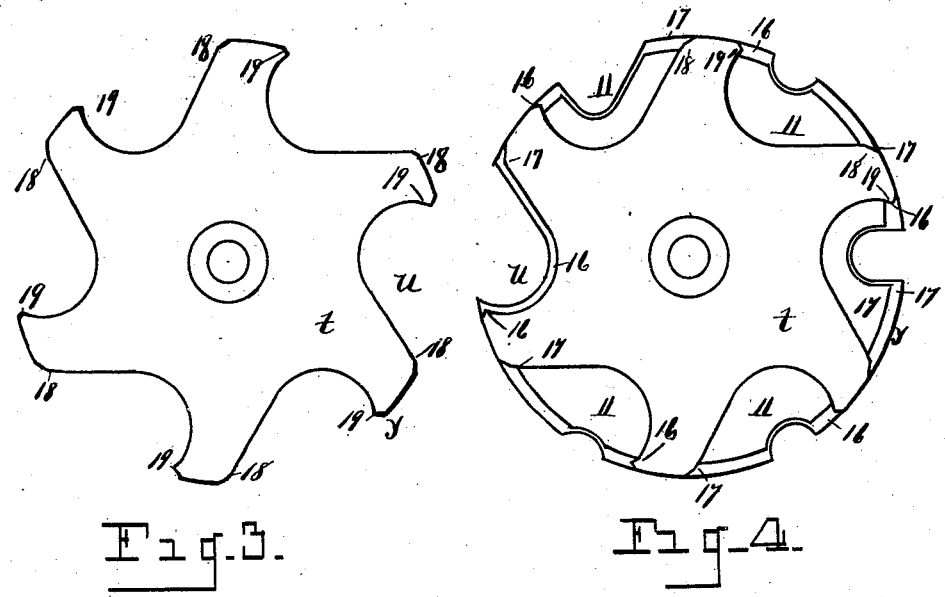
Figure 5:
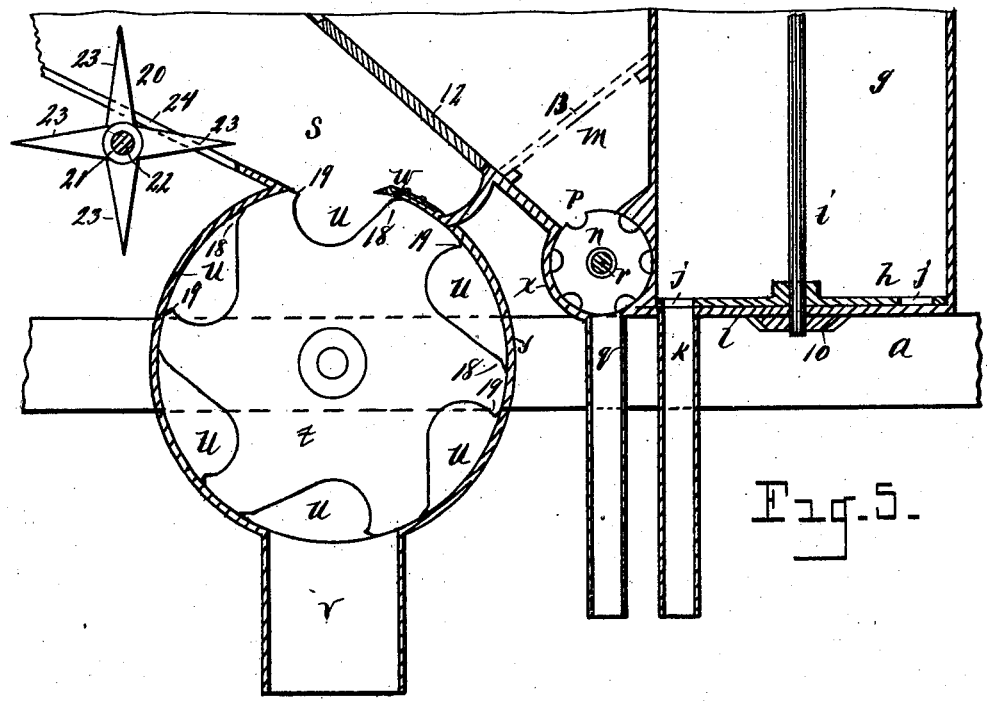
Figures 6, 7:
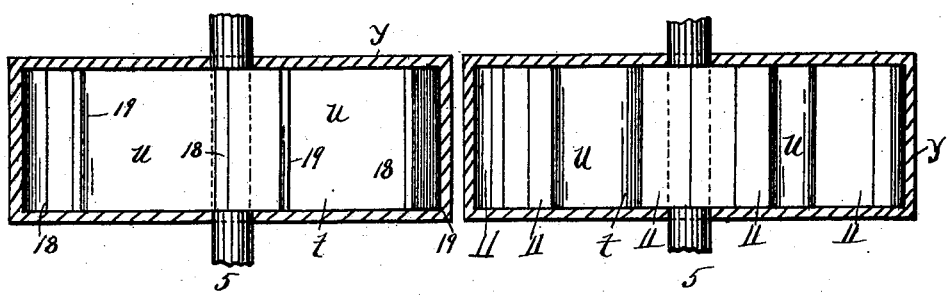
Figure 8:
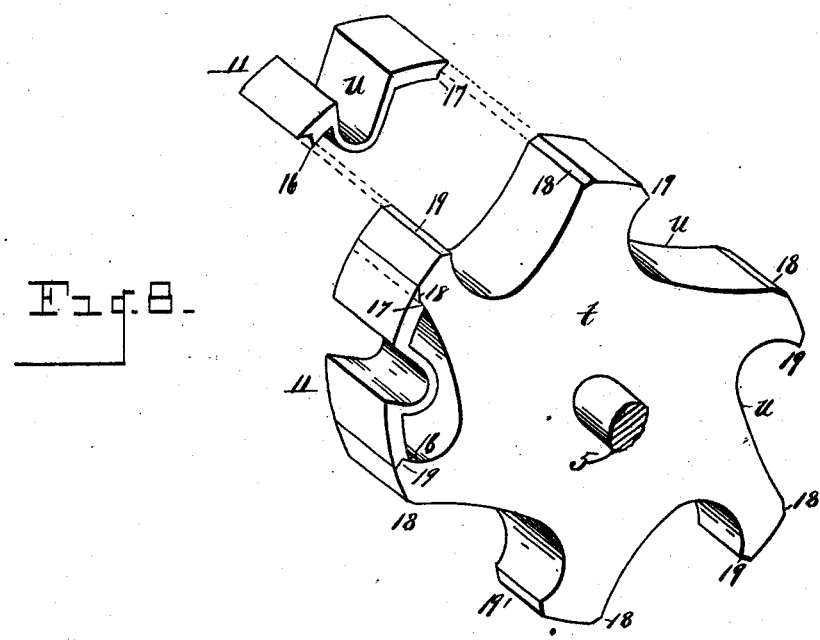

Figure 1 is a view in side elevation. Fig. 2 is a plan view. Fig. 3 is a side view of one of the seed-cylinders. Fig. 4 is a modification thereof. Fig. 5 is a view in longitudinal vertical section on the line 5 5, Fig. 2. Fig. 6 is a plan view of the feed-cylinder as shown in Fig. 3, with the case in section. Fig. 7 is a plan view of said cylinder as shown in Fig. 4, with the cover-plates engaged therewith, the case being in section. Fig. 8 is a view of said cylinder in perspective, with a cover-plate in position to be engaged in place.

More particularly my invention is designed to provide a farm implement to be used as a seed-planter and fertilizer-distributer, wherein—

$a$ represents any suitable frame.

$b$ is a beam, $c$ a roller connected with the beam, and $d$ handles of the frame, although I do not limit myself thereto.

Traction-wheels are indicated at $e$, and $f$ represents any suitable plow-point or shovel to form a furrow for the seed.

A fertilizer receptacle or hopper is indicated at $g$, the same being provided with a delivery or feed wheel $h$ at its base, preferably rotatable in a horizontal plane, the delivery wheel or disk being mounted upon the shaft $i$ and provided with orifices $j$ to discharge the fertilizer through a chute $k$, projecting through the base $l$ of the hopper $g$. An additional hopper or receptacle is indicated at $m$ for smaller seeds—as for onions, turnips, &c.—provided with a delivery or feed wheel $n$ at the base thereof, preferably rotatable in a vertical plane, as shown, said delivery-wheel $n$ being provided with a series of pockets $p$ upon the periphery thereof, arranged to carry seeds from the hopper $m$ and to discharge the same through a chute $q$ into the furrow made by the shovel $f$. The delivery-wheel or feed-cylinder $n$ is mounted upon a shaft $r$.

A hopper for potatoes or larger seeds to be planted is indicated at $s$, the same being provided at its base with a feed or delivery cylinder, (indicated at $t$,) said cylinder $t$ formed with seed-pockets (indicated at $u$) upon the periphery thereof. The feed-cylinders $n$ and $t$ may be similarly constructed, the potatoes or other seed dropping into the pockets on the periphery of the corresponding cylinder to be delivered therefrom in the rotation of the cylinder. The feed-cylinder $t$ is arranged to discharge into the chute $v$, whereby the seed is distributed into the furrow opened by the shovel $f$. At the base of the hopper $s$ I prefer to provide a slicing-knife (indicated at $w$) to be used in cutting such seeds as potatoes—for example, in case the potatoes should be too large to be received into the pockets $u$ of the feed-cylinder.

It will be understood that the feed-cylinders $n$ and $t$ are provided with corresponding outer cases (indicated at $x$ and $y$) fitting closely over the corresponding cylinders, said cases opening at the base into the chutes $q$ and $v$, respectively, and at the upper portions thereof into the hoppers $m$ and $s$, respectively.

The feed or delivery cylinders in the various hoppers may be driven by any suitable mechanism from the traction-wheels $e$, said traction-wheels being shown provided with a sprocket-wheel, (indicated by the numeral 1 on the shaft 2 of the traction-wheels,) said sprocket-wheel 1 connected by a suitable chain 3 with a sprocket-wheel 4 upon the shaft 5 of the feed-cylinder $t$ and with a sprocket-wheel 6 upon the shaft $r$ of the feed-cylinder $n$ and with a sprocket-wheel 7 upon a shaft 8, provided with a gear 9, meshing with a gear 10 upon the shaft $i$. I do not, however, limit myself solely to this arrangement of gear for driving the delivery-wheels or feed-cylinders, as said cylinders or delivery-wheels may be driven in any suitable manner within the scope of my invention.

The pockets of the feed-cylinder $t$ may be provided with a slide or cover plate, (indicated at 11,) whereby the pockets $u$ may be closed, if desired, to deposit the potatoes or other seed at longer intervals one from another and whereby the dimensions of the pockets may be limited, when desired, for the delivery of the smaller seed, such as corn, beans, and the like. Thus the cylinder $t$ may be made to feed either potatoes or smaller seeds, as may be desired, by the insertion of the pocket plates or slides, which may be of different forms or thicknesses to diminish the capacity of the pockets or to close them entirely, if preferred.

Between the hoppers $m$ and $s$ I prefer to provide a removable slide, (indicated at 12,) so that the space between the two hoppers may be thrown into one, if desired, to feed the contents by means of the cylinder $t$ into the soil. By removing the slide 12 the capacity of the receptacle thus formed may obviously be increased. When this is done, I prefer to insert a slide 13 toward the base of the hopper $m$ to direct the seed into the feed-cylinder $t$. To the rear of the cylinder $t$ I provide a scraper-blade (indicated at 14) to cover the seed.

It will be evident that only one of the feed-cylinders $n$ and $t$ will be in operation at the same time. The sprocket-chain may be changed or varied in length, as may be desired, to drive either of the feed-cylinders $n$ or $t$.

The cover-plates 11 may be engaged in place in any suitable manner. Thus, for example, they may be constructed at their transverse extremities with grooved flanges 16 and 17 to fit over corresponding portions or tongues at the transverse outer edges of the pockets (indicated at 18 and 19) of the feeding-cylinder.

An agitator (indicated at 20) is provided, consisting of a hub 21, engaged upon the shaft 22, the hub provided with arms 23, projecting into the hopper $s$ through a slot 24 in one wall of said hopper, the agitator being designed to prevent the potatoes or other seed lodging in the hopper. The agitator-shaft 22 is driven from the shaft 2 of the traction-wheels, as by a belt 25 or in any other suitable manner.

It will be seen that the slides 11 have a tongue-and-groove connection at their extremities with the cylinder. By this arrangement they can readily be inserted and removed.

It will be evident that the case of the feeding-cylinder serves to hold the cover-plates in place.

It will be seen that my invention provides a multifarious seed-planter. By means of the two seed-hoppers and their respective feed-cylinders, said cylinders having pockets of different dimensions, seeds of different dimensions or kinds may be simultaneously planted. At the same time either of these cylinders may be provided with feeding-slides of different capacities for feeding different kinds of seeds. The feeding-slides may be supported wholly at their marginal edges and above the base of the pockets in the cylinder. The pockets in the cylinder being of larger dimensions than the slides permit the introduction of slides of varying capacities.

What I claim as my invention is—

1. A seed-planter having in combination a frame, a hopper, a feed-cylinder rotatable in a vertical plane at the base of the hopper provided with pockets on its periphery arranged to receive seed from the hopper and to discharge the seed therefrom, removable slides supported at their transverse edges upon the cylinder and above the base of said pockets to control the dimensions of said pockets, and a case about said cylinder said slides having a tongue-and-groove connection at their transverse edges upon the outer transverse edges of said pockets and held in place by said case.

2. A seed-planter, having in combination a frame, a hopper, a feeding-cylinder rotatable in a vertical plane at the base of the hopper provided with seed-pockets arranged to receive seed from the hopper and to discharge it therefrom, a case for said feeding-cylinder opening into the hopper and provided with a discharge-opening, and removable slides supported at their transverse edges upon the cylinder above the base of the pockets and spaced therefrom to control the dimensions of said pockets, said slides having a tongue-and-groove connection at their transverse edges upon the outer transverse edges of said pockets and held in place by said case.

3. A seed-planter, having in combination a frame, a hopper, a rotatable feed-cylinder at the base of the hopper provided with seed-pockets on its periphery removable slides having a tongue-and-groove connection at their transverse edges upon the outer transverse edges of said pockets above the base of said pockets to control the dimensions of the pockets, and a case for said cylinder, said slides held in place by said case, said case covering the lateral edges and ends of said slides.

4. A seed-planter, having in combination a frame, a hopper, a feed-cylinder rotatable in a vertical plane at the base of the hopper provided with seed-pockets on its periphery arranged to receive seed from the hopper and to discharge the seed therefrom, and removable slides having a tongue-and-groove connection at their transverse edges upon the outer transverse edges of said pockets above the base of the pockets to control the dimensions of said pockets, a case for said cylinder and a knife mounted upon said case adjacent to said opening.

In testimony whereof I sign this specification in the presence of two witnesses.

FREDERICK BERLIN.

Witnesses:
N. S. WRIGHT,
M. HICKEY.